Patented Feb. 23, 1932

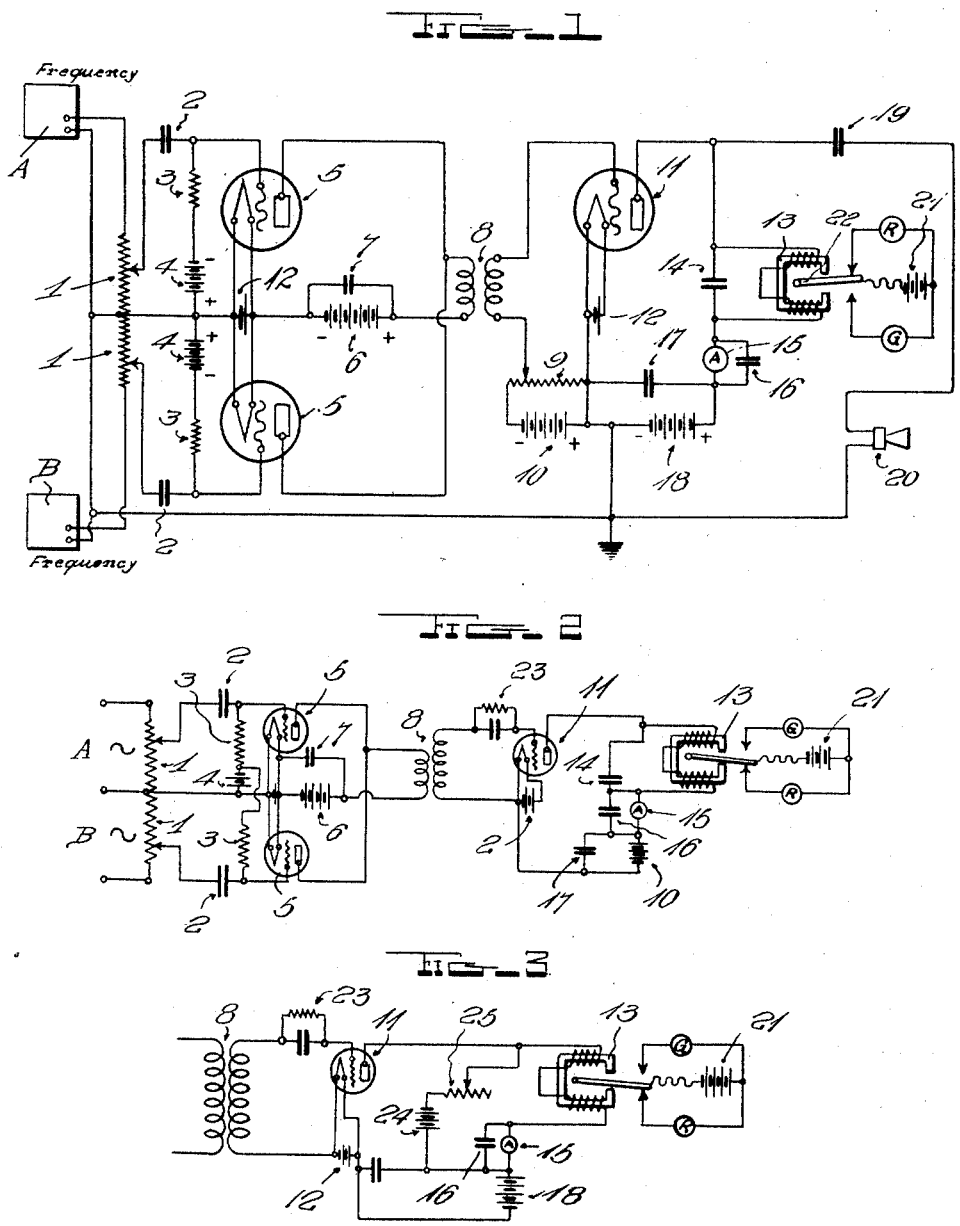

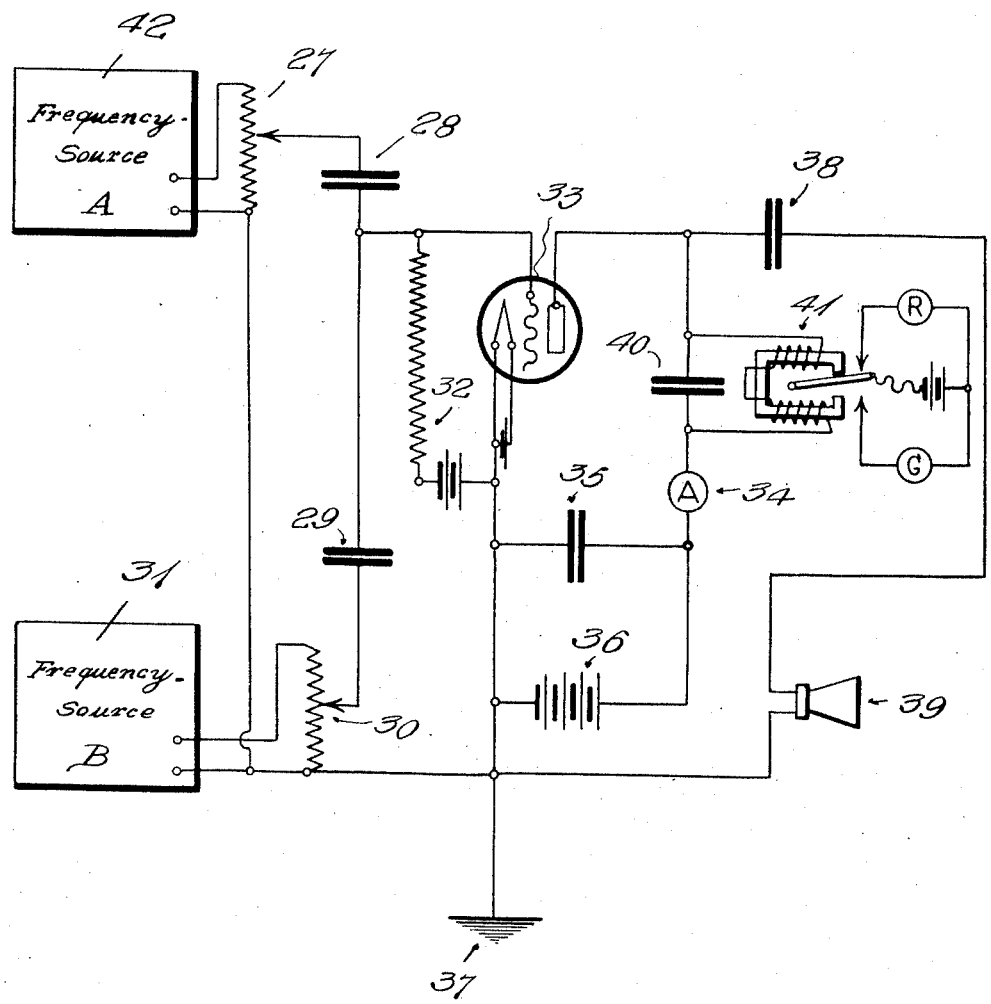

1,846,314

UNITED STATES PATENT OFFICE

ALFRED CROSSLEY, OF SOUTH HAVEN, MICHIGAN

BEAT FREQUENCY AND PHASE INDICATOR

Application filed April 18, 1929. Serial No. 356,120.

My invention relates broadly to indicating apparatus and more particularly to a beat frequency indicator.

One of the objects of my invention is to provide an apparatus for accurately indicating the frequency of an electrical circuit.

An other object of my invention is to provide a compact form of portable apparatus by which the frequency of the current in an electrical circuit may be determined with a high degree of accuracy by utilizing the effect of beats upon an indicating apparatus.

A further object of my invention is to provide a frequency indicator wherein an unknown frequency may be compared with a source of known frequency and a beat frequency derived, which beat frequency may be measured for giving an accurate indication of the value of unknown frequency.

Other and further objects of my invention reside in the circuit arrangements of the apparatus constituting the beat frequency indicator of my invention as described more fully in the specification hereinafter following and set forth in the accompanying drawings.

This application for Letters Patent is a continuation in part of my application Serial No. 284,572 for frequency and phase indicating system, filed June 11, 1928.

Referring briefly to the drawings; Figure 1 is a diagrammatic illustration of the beat frequency indicator of my invention; Fig. 2 is a modified wiring diagram of the beat frequency indicator of my invention; Fig. 3 shows a further modification in the wiring of the indicator circuit in the beat frequency indicator; and Fig. 4 shows a simplified embodiment of my frequency indicator wherein the frequencies from the separate sources are impressed directly on the grid of the detector tube.

My invention is directed to the measurement of absolute standards of frequency and to provide apparatus which will indicate the frequency difference in cycles between standards where the difference lies in the sub-audible frequency range, namely, from approximately 40 to less than one cycle, and if necessary the phase relationship of the two frequency sources. I have referred to the apparatus of my invention as the "beat frequency indicator".

My beat frequency indicator may be described as a means whereby the oscillations from one frequency source is made equal to those from another source by resort to the use of two potentiometers or voltage dividers each of which function in supplying an equivalent voltage from the respective sources to the grids of two amplifying tubes. These tubes amplify the respective voltages and combine them in the primary of a radio or audio frequency transformer which through its secondary impresses these voltages on the grid of a blocked grid or detector tube. If the two voltages arrive at the grid of the detector tube with equal intensity, beats will occur in the plate circuit of the tube.

The beat phenomena can be indicated visually or aurally. The aural indicator may be a loud speaker or, if the power is great enough, a commercial type frequency meter may be employed as a visual indicator. When the frequency is below the range of a loud speaker or meter, resort may be made to the use of a relay which is actuated by the plate current variations. This relay in turn may actuate some form of chronograph or, if the frequency is below the range of persistent vision say 15 cycles, the relay can be made to operate a red and green lamp system which can flicker on and off in accordance with the beats. If, however, there is no difference in frequency between the two sources but a difference in time of starting of the two sources i. e., a fixed phase difference, the relay will be in one position or another, for instance, if the frequencies are exactly in step there will be an addition of plate current, while if they are out of step, the plate current will be reduced according to how far they are out of step. The relay, preferably of the polar type, can be adjusted to "click off" at maximum plate current condition and light a green light while when in the out of step condition, i. e., smaller plate current, the relay returns to the neutral position and lights a red light. The above conditions refer to the use of the blocked grid tube as a detector. If a grid leak and condenser are employed, the reverse condition of plate current variation is noted.

Experiments conducted with two frequency sources of approximately 500 kilocycles, one of which was a self-oscillating circuit and the other a crystal oscillator, showed that it is possible to adjust the frequency of the self-oscillator to be equal to the crystal oscillator as indicated by the green light, and under conditions of a semi-tight coupling the two frequencies will pull each other into step and hold this condition for as long as twenty minutes without manual adjustments.

Referring to the drawings in detail, two sources of frequency "A" and "B" are shown connected to the beat frequency indicator of my invention. Both sources feed into the potentiometers 1 and pass through the condensers 2 to the grids of each of the radio frequency amplifier tubes 5. A high resistance 3 and a negative "C" battery 4 maintain the grids at the desired biasing potential. The plates of the two tubes 5 are tied together and their combined outputs feed into the primary of transformer 8 and by the agency of the secondary the two frequency voltages are impressed on the grid of the detector tube 11. The potentiometers 1 provide for the accurate adjustment of the voltages from the two sources so that they have equal values when impressed upon the grid of the detector tube. The maintenance of this relation of equality is important, since this is a beat frequency phenomenon. The effectiveness of beat frequency response is directly proportional to the ratio of voltages from the two frequency sources which are to be compared. If the voltages from the two sources are equal, the response can be considered to be 100% effective. If one voltage has half the value of the other, then the response, that is the power, obtained on the beat frequency is 50%.

In Fig. 1, a means consisting of the potentiometer 9 and battery 10 is employed to adjust the grid biasing potential so that a minimum plate current is obtained, as indicated by the meter 15, when no excitation is supplied to the grid from transformer 8. When the excitation voltage is applied to the grid of tube 11, the plate current rises in proportion to the strength of the exciting voltage. In Fig. 1 the tube 11 is practically blocked so far as plate current is concerned, and as soon as the exciting voltage is applied to the grid, there is a rise in plate current similar to that observed with any blocked grid detector.

Two visual means for determining the frequency difference are shown in Fig. 1. One type is the meter 15 with the radio frequency by-pass condenser 16 and the other is the relay 13. Connected with the relay is a radio frequency by-pass condenser 14 and a red and green light combination designated "R" and "G" which functions under action of relay contacts 22 and the battery 21. The green light goes on when the relay is actuated by a maximum current impulse while the red light operates at plate current of lower value. Battery 18 supplies necessary plate voltage for tube 11 and condenser 17 by-passes the radio frequency current around this battery.

The meter 15 is a good visual indicator at low sub-audible beat frequencies due to its pointer swinging back and forth in step with the plate current variations corresponding to the beat frequency. It is a definite means in addition to the lamp system for determining the in-step or fixed phase relation of the two frequencies; for instance, if both frequencies are in step the meter shows the greatest deflection and this deflection decreases in value for conditions when the frequencies are out of step finally reaching a minimum when a 180 degree relationship is obtained. The loud speaker 20 serves as an aural indicator of beat frequency. The required audio frequency voltage for operation of the loud speaker is obtained from the plate circuit through the condenser 19. It may be said in this instance, that the relay 13 with its small by-pass condenser 14 provides sufficient choking effect at audio frequencies to reject enough audio frequency voltage to operate the loud speaker. A plate current change of five milliamperes has been found sufficient to operate a loud speaker in this circuit and obtain a sound response which can be heard for a distance of approximately two hundred feet.

I show one stage of amplification with the indicators, since it provides a convenient means for stopping circuit interactions. It is possible, however, to dispense with this stage and impress the electrical energy from the potentiometer 1 directly on the grid electrode of the detector tube 11 to obtain the desired result, as shown in Fig. 4.

The system described may be used to advantage for accurate calibrations of two frequency standards and also as a means for denoting frequency changes which may be due to any cause. It can also be employed for monitoring radio frequency generators of all types provided one frequency source is a piezo electric crystal oscillator or a similar constant frequency generator. There are numerous other uses to which this system can be applied because of the precision measurement which is possible by this method.

In Fig. 2 a grid leak and stopping condenser 23 are employed in place of the biasing battery 10 of Fig. 1. As previously stated, the reverse current or relay action is observed with this combination in circuit 21 and in view of this condition the lamps are reversed i. e., the green lamp is placed above the red lamp. The grid leak and condenser 23 causes an increase in negative potential on the grid or in effect a maximum decrease in plate current when the grid voltage excitation is greatest.

This latter method with circuit shown in Fig. 2 will indicate very definitely when the two sources are 180 degrees out of phase, because of the maximum plate current in detector plate or relay circuit when the two excitation voltages cancel each other. This maximum current condition will throw the relay armature to the red lamp side if the relay is adjusted to operate at the maximum current condition. The true in phase condition cannot be accurately indicated by this relay combination but can be noted by the minimum deflection on the meter 15.

This grid leak and condenser circuit 23 can be modified to indicate definitely the true in phase condition by resorting to the modified relay circuit shown in Fig. 3. In this figure a battery 24 and a resistance 25 are shunted across the relay. The direction and magnitude of the current from the battery 24 are such as to reduce the current flow through the relay to zero. As shown, the battery terminal nearest the plate of the tube is negative, and provides a voltage opposed in polarity to the positive voltage drop across the windings of relay 13. Consequently, with resistance 25 adjusted, the relay will be in the unenergized condition. The adjustment for the zero current value is obtained by varying the resistance 25. The adjustment is made with no exciting voltage on the grid of the tube. It can be readily noted that as soon as the grid is excited that the plate current will be reduced and due to a change of equilibrium in the relay circuit, there will be an increase of current through the relay reaching a maximum value when the plate current is at a minimum. This current flow will be in the reverse direction but the polarized relay can be adjusted to operate under these conditions and also at any value of current which represents the condition equivalent to the in phase relationship of the two frequency sources.

Fig. 4 shows an arrangement wherein amplification is omitted and the energy from potentiometer 1 is impressed directly on the grid of a common detector tube. 31 and 32 are sources of stabilized frequency. 27 and 30 are potentiometers controlling the energy delivered from sources 31 and 32. 33 is the common detector. 28 and 29 are condensers. 32 is a resistance of about one-half megohm or a grid filament matching impedance and is also a means for conducting the necessary biasing voltage to the grid of the detector tube. This system with common detector should not be used if the frequency stability of the sources to be compared is not excellent, since with ordinary self-oscillating tube circuits there is a mutual pulling together or synchronizing effect when the two frequencies approach each other.

There are numerous uses for this indicator, but the principal application at present is for the absolute control of frequency. This may apply to a broadcasting station at radio frequencies or the control of frequency at a power house where 25 or 60 cycle current is required. It also can be used to assist in synchronizing two generators or it can be used to synchronize one generator at one station with another generator which is situated at another station. This latter condition is met with when a local power station requires extra power from a distant source to tide them over during the peak load periods.

In operation of the apparatus of my invention the two branch circuits of the beat frequency indicator are independent, one circuit being set for the known or standard frequency, while the other circuit is substantially aperiodic over the required range for permitting a comparison of the unknown frequency with the known frequency. The relation between the known and the unknown frequencies becomes apparent by the operation of the indicator lamps. When the unknown frequency is brought to a condition where it matches in value the standard frequency and is in phase with the standard frequency, the currents from both the standard frequency source and the unknown frequency source are integrated and operate the polarized relay system whereby the circuit of the green lamp is energized.

Where the unknown frequency differs from the known frequency and is out of phase with respect to the known frequency, the red lamp will be energized since the current through the relay system is lower because of the tendency of the component currents impressed upon the circuits of electron discharge device 11 tending to neutralize themselves.

The apparatus of my invention has been found to be extremely practical in its operation, and while I have described certain preferred embodiments thereof, I desire that it be understood that modifications thereof may be made and therefore that no limitations are intended upon its scope except those limitations imposed by the appended claims.

What I claim as new and desire to secure by Letters Patent of the United States is as follows:

1. In a beat frequency indicator for determining the phase and frequency relationships between a known frequency and an unknown frequency, a pair of branch circuits, a source of known frequency connected to one of said branch circuits by means of a resistance type of variable voltage divider, a source of unknown frequency connected to the other of said branch circuits by means of a resistance type of variable voltage divider, and indicator means connected to said branch circuits for integrating the effects of each of said sources when the unknown frequency is brought to a value equal in frequency to the frequency of the standard of the known frequency.

2. In a frequency indicator apparatus a pair of branch circuits, an electron tube connected with each of said branch circuits, individual input circuits and a common output circuit for said tubes, a detector system in electrical relation with said common output circuit, a relay controlled by said detector system, said relay being movable to either of two positions, a pair of independent indicator circuits controlled by said relay, a source of energy of known frequency connected to one of said branch circuits by means of a variable resistor type of voltage divider, a source of energy of unknown frequency connected to the other of said branch circuits by a variable resistor type of voltage divider whereby both of said frequencies are delivered to said common output circuit, the effects thereof are integrated in said detector system, said relay is selectively actuated, and said frequencies are compared.

3. In a frequency indicating system, a plurality of electron tubes each having grid, filament and plate electrodes, input and output circuits interconnecting said electrodes, the output circuits of a pair of said electron tubes being connected in common, a source of known frequency connected to the input circuit of one of said tubes by means of a variable resistance type of voltage divider, a source of unknown frequency connected to the input circuit of another of said tubes by means of a variable resistance type of voltage divider, said output circuit being coupled to the input circuit of a succeeding electron tube, and means controlled by said succeeding electron tube for indicating the frequency and phase difference between said source of known frequency and the source of unknown frequency.

4. In a frequency indicator a pair of electron tube circuits having independent input systems and a common output system, an electron tube detector coupled to said common output system, a relay connected to said electron tube detector and shiftable to either one of two positions, separate indicators selectively controlled by said relay, one of said input systems being connected with a source of standard frequency by a resistor type of voltage divider, and the other of said input systems being connected with a source of unknown frequency by a resistor type of divider, the currents from each of said sources being integrated by said electron tube detector for selectively controlling the position of said relay and operating either one of said indicators in accordance with the difference in phase and frequency between the unknown source and the standard source, the system of said relays and indicators being responsive substantially uniformly at frequencies throughout and below the audible range.

5. In a frequency indicating apparatus an electron tube circuit comprising a detector, a relay system connected with said detector and shiftable to either one of two selected positions depending upon the current delivered by said detector, a pair of independent control circuits controlled by said relay, a pair of branch circuits connected to the input circuit of said detector, a source of energy of known frequency connected to one of said branch circuits, a source of energy of unknown frequency connected to the other of said branch circuits, said other of said branch circuits being substantially aperiodic, means for varying the impression of energy upon said branch circuits from said sources, said means transmitting said energy with substantially uniform efficiency at all frequencies within and below the audible range and without distortion of phase relations, whereby an interaction is produced between the known frequency and the unknown frequency and the effects thereof are integrated upon said detector and the operation of said relay and the condition of said control circuit are controlled by the frequency and phase relation of said sources.

6. In a system for comparing oscillations, a source of oscillations of known frequency, a source of oscillations of unknown frequency, a detector tube, input and output circuits therefor, individual variable voltage dividers of resistance type connected for variably controlling the transfer of energy from said sources to the input circuit of said tube, and equalizing the amplitudes of the oscillations from said sources, said voltage dividers being adapted to transfer energy without phase distortion and with substantially uniform efficiency at frequencies of from one per second to three thousand per second, a relay having its winding connected with the output circuit of said tube, and a plurality of visual indicating means controlled by said relay for selectively indicating the frequency and phase relations of the oscillations from said sources.

7. In a system for comparing oscillations, a source of oscillations of known frequency, a source of oscillations of unknown frequency, a detector tube, input and output circuits therefor, means for variably controlling the transfer of energy from each of said sources to the input circuit of said tube and delivering said energies at substantially equal voltage levels to said input circuit, said means being adapted to transfer energy without phase distortion and with substantially uniform efficiency at frequencies from one per second to three thousand per second, and visual indicating means actuated by the output circuit of said detector tube for indicating the frequency and phase relations of the oscillations from said sources.

8. In a system for comparing oscillations, a source of oscillations of known frequency, a source of oscillations of unknown frequency, a pair of thermionic amplifier tubes, individual input circuits and a common output circuit therefor, individual variable voltage dividers of resistance type connected for respectively variably controlling the transfer of energy from said sources to the individual input circuits of said amplifier tubes, said voltage dividers being adapted to transfer energy without phase distortion and with substantially uniform efficiency at frequencies of from one per second to three thousand per second, a detector tube, input and output circuits therefor, the input circuit of said detector tube being in electrical relation with the common output circuit of said amplifier tubes and receiving amplified oscillations derived from each of said sources at substantially the same voltage level, a relay having its winding connected with the output circuit of said detector tube, and a plurality of visual indicating means controlled by said relay for selectively indicating the frequency and phase relations of the oscillations from said sources.

9. In a system for comparing oscillations, a source of oscillations of known frequency, a source of oscillations of unknown frequency, a pair of thermionic amplifier tubes, individual input circuits and a common output circuit therefor, individual means for variably controlling the transfer of energy from each of said sources to the individual input circuits of each of said amplifier tubes, said means being adapted to transfer energy without phase distortion and with substantially uniform efficiency at frequencies from one per second to three thousand per second, a detector tube, input and output circuits therefore, the input circuit of said detector tube being in electrical relation with the common output circuit of said amplifier tubes and receiving amplified oscillations derived from each of said sources at substantially the same voltage level, and a plurality of visual indicating means actuated by the output circuit of said detector tube for indicating the frequency and phase relations of the oscillations from said sources.

10. In a frequency indicating system, a source of alternating current of known frequency, a source of alternating current of unknown frequency, a pair of thermionic amplifier tubes, input circuits for each of said tubes respectively connected to said sources of alternating current, independent means in each of said input circuits for equalizing the input energy delivered to each of said amplifier tubes, a detector tube, circuits wherein the outputs of said amplifier tubes are combined and delivered to the input of said detector tube, and means in the output circuit of said detector tube for indicating the value of current in said output circuit of said detector tube.

ALFRED CROSSLEY.